(12) United States Patent
Chang

(10) Patent No.: US 11,135,746 B2
(45) Date of Patent: Oct. 5, 2021

(54) RAPID MOLD REPLACING DEVICE FOR USE IN MOLDING MACHINE

(71) Applicant: Tsai-Shun Chang, New Taipei (TW)

(72) Inventor: Tsai-Shun Chang, New Taipei (TW)

( * ) Notice: Subject to any disclaimer, the term of this patent is extended or adjusted under 35 U.S.C. 154(b) by 160 days.

(21) Appl. No.: 15/942,234

(22) Filed: Mar. 30, 2018

(65) Prior Publication Data

US 2019/0009435 A1 Jan. 10, 2019

(30) Foreign Application Priority Data

Jul. 5, 2017 (TW) .................................. 106122467

(51) Int. Cl.
*B29C 33/30* (2006.01)
*B29C 49/48* (2006.01)
*B29C 45/17* (2006.01)

(52) U.S. Cl.
CPC ........ *B29C 33/305* (2013.01); *B29C 45/1742* (2013.01); *B29C 49/48* (2013.01); *B29C 2049/4856* (2013.01)

(58) Field of Classification Search
CPC ......... B29C 49/30; B29C 49/28; B29C 33/30; B29C 2049/5893; B29C 33/202
USPC .................. 425/190, 182, 185, 522
See application file for complete search history.

(56) References Cited

U.S. PATENT DOCUMENTS

| 4,248,583 | A | * | 2/1981 | Hedke | ................... | B29C 33/202 |
|---|---|---|---|---|---|---|
| | | | | | | 425/450.1 |
| 4,348,165 | A | * | 9/1982 | Vostrovsky | ......... | B29C 45/1743 |
| | | | | | | 425/185 |
| 4,676,474 | A | * | 6/1987 | Vallet | ................... | B29C 45/1775 |
| | | | | | | 249/68 |
| 5,314,323 | A | * | 5/1994 | Bolles | ................. | B29C 45/4005 |
| | | | | | | 249/219.1 |
| 5,525,052 | A | * | 6/1996 | Czarnetzki | ................ | B29B 9/06 |
| | | | | | | 425/183 |
| 5,620,718 | A | * | 4/1997 | Bohm | ................. | B29C 45/1743 |
| | | | | | | 425/190 |
| 7,179,076 | B1 | * | 2/2007 | Vanderwoude | ..... | B29C 45/2673 |
| | | | | | | 425/192 R |
| 8,002,539 | B2 | | 8/2011 | Chang et al. | | |

(Continued)

FOREIGN PATENT DOCUMENTS

JP   58171913 A  * 10/1983  ........... B29C 33/485
TW   201404572 A    2/2014

*Primary Examiner* — Francisco W Tschen
*Assistant Examiner* — Edgaredmanuel Troche
(74) *Attorney, Agent, or Firm* — Guice Patents PLLC

(57) ABSTRACT

A rapid mold replacing device for use in molding machine comprises: a molding machine, including a machine table defined with an operating zone and an open space adjacently arranged; a carrier, disposed on the machine table and allowing a mold to be positioned thereon, driven by a transmission mechanism, thereby capable of being moved and positioned between the operating zone and the open space; and an open/close driving mechanism, including a pair of moveable plates oppositely disposed and arranged at two sides of the operating zone, wherein the pair of moveable plates are driven by the open/close driving mechanism, thereby forming an opening/closing motion; two sides of the mold are respectively disposed with a lateral plate at a location adjacent to each of the moveable plates, and at least one locking mechanism is disposed between the lateral plate and the moveable plate.

10 Claims, 10 Drawing Sheets

(56) References Cited

U.S. PATENT DOCUMENTS

| | | | |
|---|---|---|---|
| 2003/0067095 A1* | 4/2003 | Persson | B29C 45/66 264/328.1 |
| 2007/0087081 A1* | 4/2007 | Ichikawa | B29C 45/4005 425/595 |
| 2009/0297654 A1* | 12/2009 | Chang | B29C 49/32 425/524 |
| 2010/0326309 A1* | 12/2010 | Nurminen | F41F 3/052 102/473 |
| 2016/0339608 A1* | 11/2016 | Liu | B29C 45/2602 |

\* cited by examiner

RAPID MOLD REPLACING DEVICE FOR USE IN MOLDING MACHINE

BACKGROUND OF THE INVENTION

1. Field of the Invention

The present invention relates to a rapid mold replacing device, especially to a rapid mold replacing device for use in molding machine, for example an injection molding machine, a bottle blowing molding machine or an injection bottle blowing molding machine.

2. Description of Related Art

A molding machine, for example an injection molding machine, a bottle blowing molding machine or an injection bottle blowing molding machine is a must-have equipment for manufacturing plastic products or hollow plastic products. The above-mentioned molding machine is to utilize a mold for manufacturing the plastic products, thus different molds are required for replacements if different types of plastic products are desired to be manufactured.

When the mold is desired to be replaced in the molding machine, a manual force is firstly applied for removing the mold from an operating zone defined on a machine table of the molding machine, then the mold is moved to an open space; a hoisting crane is utilized for hoisting the mold to be away from the machine table; a new mold is hoisted and disposed in the open space, the manual force is then utilized for pushing and moving the new mold to the operating zone so as to be positioned; lastly, the new mold is installed, for example locked, at the operating zone of the machine table.

The molds have different weights due to the dimension and the quantity of the plastic products to be manufactured, the lighter ones may be less than 100 kilograms, and the heavier ones may be more than several hundred kilograms which cannot be taken a human power. In addition, the operating zone, for example a bottle blowing position, is provided with a limited space, so when the mold is desired to be replaced, the operations of installing and removing are hard to be processed; moreover, the mold is difficult to be transported to the open space, thereby wasting labor and consuming unnecessary working time.

In view of the disadvantages of replacing a mold in a molding machine, the skilled people in the arts have developed a mold replacement auxiliary mechanism capable of replacing the mold with less labor and allowing a mold moving distance to be easily controlled, take the Taiwan Patent Publication No. TW201404527A for instance, the mold replacement auxiliary mechanism is installed in a forming device; the forming device is disposed at a plane and includes a forming mold for shaping a bottle preform into a hollow product; the mold replacement auxiliary mechanism further includes a rail disposed on the plane and a base disposed on the forming device and moving on the rail; the base can drive the forming mold to move relative to the plane. Accordingly, this invention can save effort to replace the forming mold. As such, the base is able to allow the forming mold and an open/close driving mechanism, for example a hydraulic cylinder, used for controlling the opening or closing status of the forming mold to be moved between a bottle blowing position and an open space, so that a mold replacing operation can be processed in the open space, and an extrusion blow molding process can be performed at the bottle blowing position.

However, a left mold member and a right mold member of the forming mold are respectively locked on a left moveable plate and a right moveable plate of the open/close driving mechanism, a locking and screwing procedure for a connection member, for example a screw, is required during the mold replacing operation, thus unnecessary working time and labor are wasted; accordingly, the above-mentioned disadvantages shall be seriously concerned by the skilled people in the art.

SUMMARY OF THE INVENTION

One primary objective of the present invention is to provide a rapid mold replacing device for use in molding machine, which comprises a carrier allowing a mold to be positioned thereon, and at least one locking mechanism capable of locking the mold on an open/close driving mechanism, so that the mold on the carrier can be moved between an operating zone and an open space by utilizing a transmission mechanism, thereby allowing the mold to be rapidly and easily replaced so as to save labor and working time, and a buckling means is adopted for combining the mold and the open/close driving mechanism, there is no need of any complicated locking procedure for tightening or detaching a connection member, thus an effect of rapidly replacing a mold can be achieved.

For achieving said objective, one technical solution provided by the present invention is to provide a rapid mold replacing device for use in molding machine, which comprises: a molding machine, including a machine table defined with an operating zone and an open space adjacently arranged, wherein the machine table further includes a transmission mechanism; a carrier, disposed on the machine table, wherein a top surface thereof is disposed with a positioning mechanism for positioning a mold, the carrier is driven by the transmission mechanism, so that the carrier is able to be moved and positioned between the operating zone and the open space; and an open/close driving mechanism, including a pair of moveable plates oppositely disposed and arranged at two sides of the operating zone, wherein the pair of moveable plates are driven by the open/close driving mechanism, thereby forming an opening/closing motion; two sides of the mold are respectively disposed with a lateral plate at a location adjacent to each of the moveable plates, at least one locking mechanism is disposed between the lateral plate and the moveable plate; the locking mechanism includes a fastening lock ring received in a plate hole of the lateral plate, and a valve rod disposed in a valve chamber of the moveable plate, one end of the valve rod is fastened with a rod seat which is tightly connected to an inner circumference of the valve chamber, wherein a retracting zone allowing a fluid to be filled or returned is formed in the valve chamber defined between the rod seat and a fasten cover, and a stretching zone allowing the fluid to be filled or returned is formed between the rod seat and an interior of the valve chamber; the valve rod axially protruding from one distal end of the fasten cover disposed in the valve chamber is formed with a conical head part, an outer side of the conical head part is sleeved with an expanding/retracting lock ring, an outer circumference of the expanding/retracting lock ring is radially and annularly formed with a plurality of claw piece, and inner circumferences of the claw pieces are respectively formed with a conical surface matched with a contour of the conical head part; through selectively filling the fluid into the retracting zone or the stretching zone, the valve rod and the valve seat are able to be axially moved in the valve chamber, and the conical head part is axially moved along the conical surface, so that the claw pieces are enabled to be radially expanded or retracted, thereby forming an interfered locking status or a released unlocking status with the fastening lock ring.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
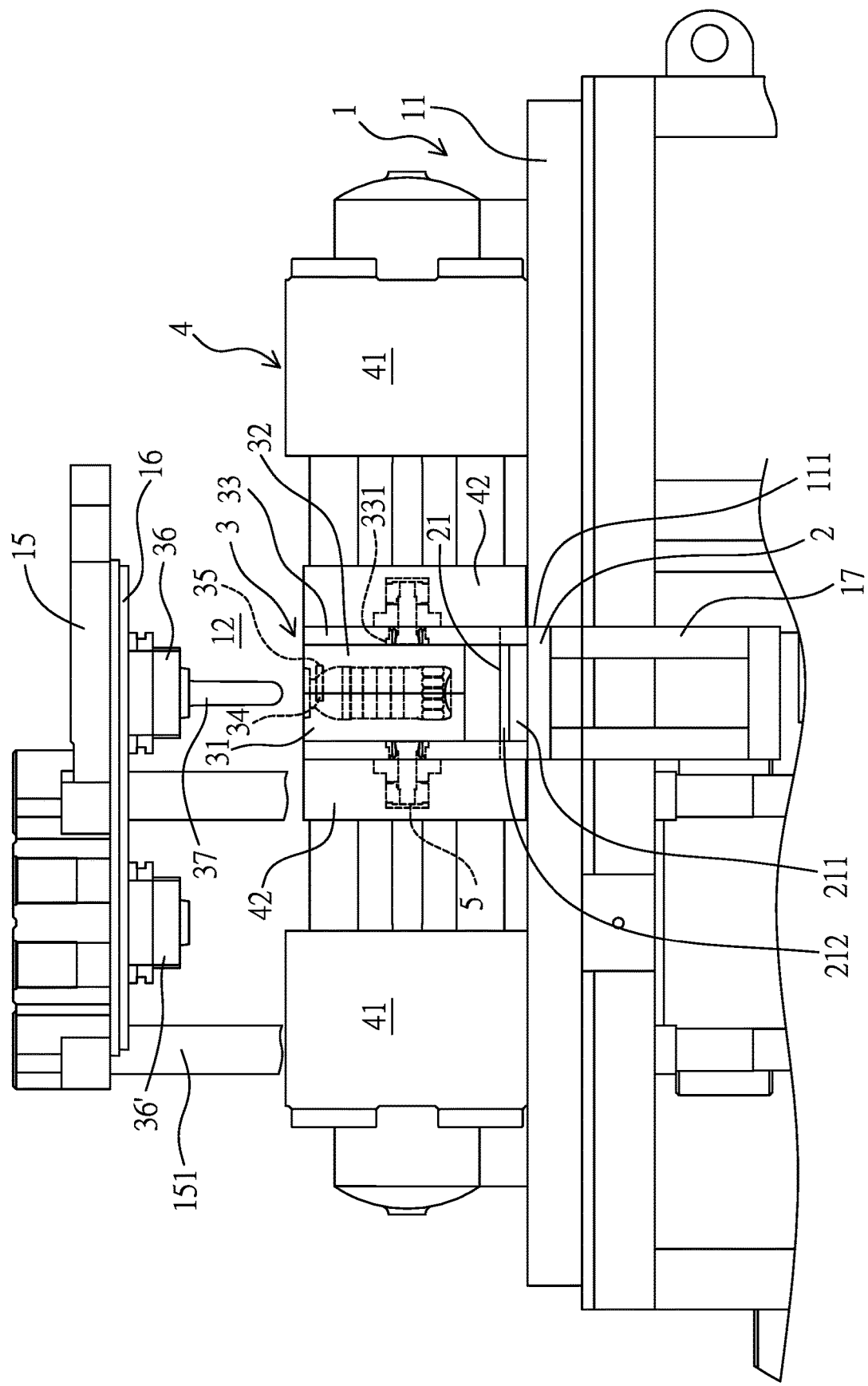
FIG. 1 is a front view illustrating the rapid mold replacing device being disposed on a molding machine according to the present invention.

Please refer from FIG. 1 to FIG. 6, the present invention provides a rapid mold replacing device, which comprises a carrier 2 disposed on a machine table 11 of a molding machine 1, for example a horizontal injection molding machine, a horizontal bottle blowing molding machine or a horizontal injection bottle blowing molding machine; the carrier 2 is disposed in a rail slot 111 formed on the machine table 11, and a top surface of the machine table 11 is defined with an operating zone 12, for example a bottle blowing position, adjacent surfaces between two sides of a mold 3 at the operating zone 12 and an open/close driving mechanism 4 are respectively disposed with at least one locking mechanism 5, so that the at least one locking mechanism 5 can be served to perform a locking or unlocking operation to the mold 3, and the inconvenience caused by tightening or detaching a connection member, for example a screw, can be avoided.

As shown from FIG. 1 to FIG. 4, the carrier 2 can be linearly moved between the operating zone 12 and an open space 13 formed adjacent to the operating zone 12, and a top surface of the carrier 2 is disposed with a positioning mechanism 21. As shown in FIG. 1, the positioning mechanism 21 includes a pair of positioning blocks 211 spaced with an interval and arranged in parallel, outer surfaces of the pair of positioning blocks 211 are adjacently connected to inner surfaces of a pair of lateral plates 33 of the mold 3, for example a bottle blowing mold, so that the mold 3 is prevented from being biasedly displaced towards the left or the right, and a circumference of one of the pair of positioning blocks 211 is additionally disposed with a stopping block 212 which is abutted against a front end surface or a rear end surface of the mold 3, thereby allowing the mold 3 to be positioned on the top surface of the carrier 2, and the mold 3 is prevented from being biasedly displaced while the carrier 2 being moved. For avoiding a left mold member 31 and a right mold member 32 of the mold 3 from being separated while being transported or moved, adjacent surfaces between the left mold member 31 and the right mold member 32 are correspondingly disposed with at least one positioning pin 34 and at least one positioning hole 35 which are in an inserted status, thereby preventing the left mold member 31 and the right mold member 32 from being separated.

A transmission mechanism 14 is disposed at the bottom end of the rail slot 111 of the machine table 11. The transmission mechanism 14 includes a power source 141, for example an oil pressure motor (hydraulic motor) capable of normally and reversely rotating, and a transmission member 142, for example a transmission gear, connected to the power source 141 and used for outputting power; and a passive member 22, for example a gear rack, driven by the transmission member 142 and is disposed on a lateral surface defined at the bottom end of the carrier 2. As such, when the oil pressure motor is actuated, the transmission gear is driven to rotate, and the carrier 2 having the gear rack is driven to be linearly moved, so that the carrier 2 can be moved or positioned between the operating zone 12 and the open space 13, and an extrusion blow molding process can be conveniently performed at the operating zone 12, or a mold replacing operation can be processed in the open space 13.

What shall be addressed is that the constitution of the transmission mechanism 14 is not limited to the above-mentioned arrangement in actual practice; according to another embodiment, the transmission member 142 can be a screw rod, the passive member 22 can be a screw sleeve allowing the screw rod to be sleeved thereon, and the same linear moving effect can be achieved. Or, according to one another embodiment, the power source 141 can be a fluid driving cylinder, for example a hydraulic cylinder or a pneumatic cylinder, the transmission member 142 can be a retractable rod, the passive member 22 can be a connection sleeve pivoted at one free end of the retractable rod, and the same linear moving effect can be achieved.

Figure 2:
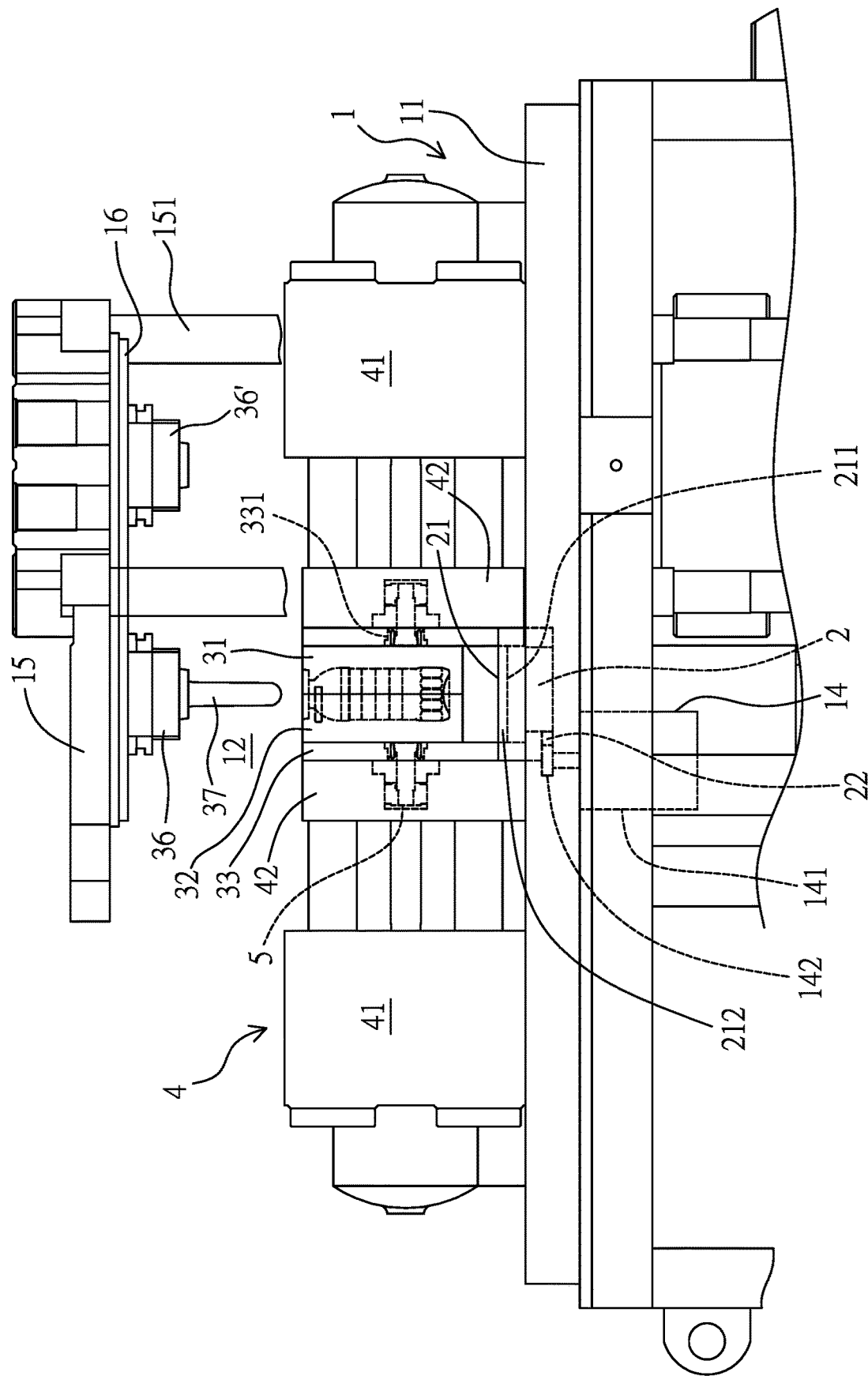
FIG. 2 is a rear view illustrating the rapid mold replacing device being disposed on the molding machine according to the present invention.
Figure 3:
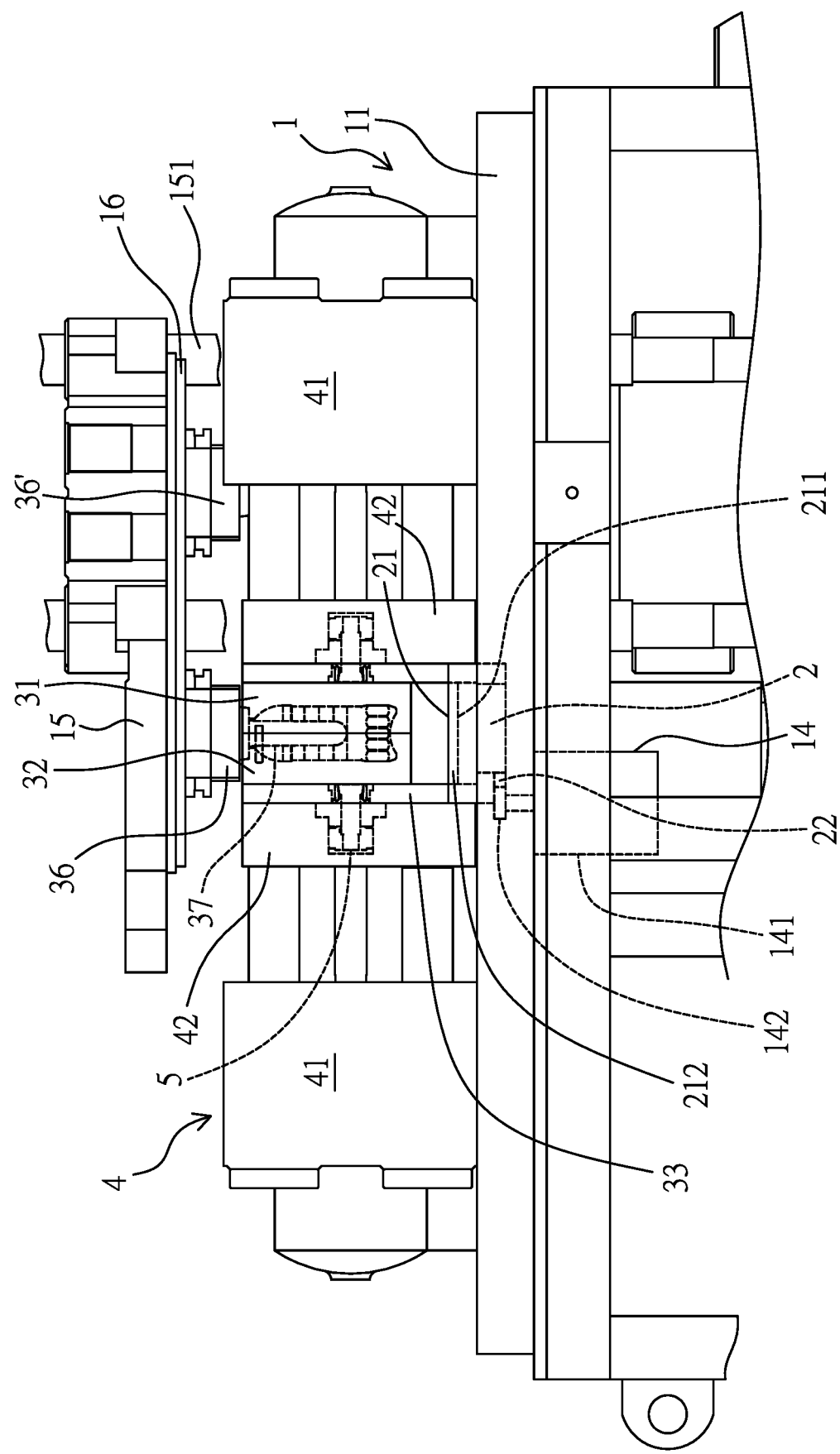
FIG. 3 is a schematic view illustrating the mold of FIG. 2 being located at an operating zone and an extrusion blow molding process being performed.
Figure 4:
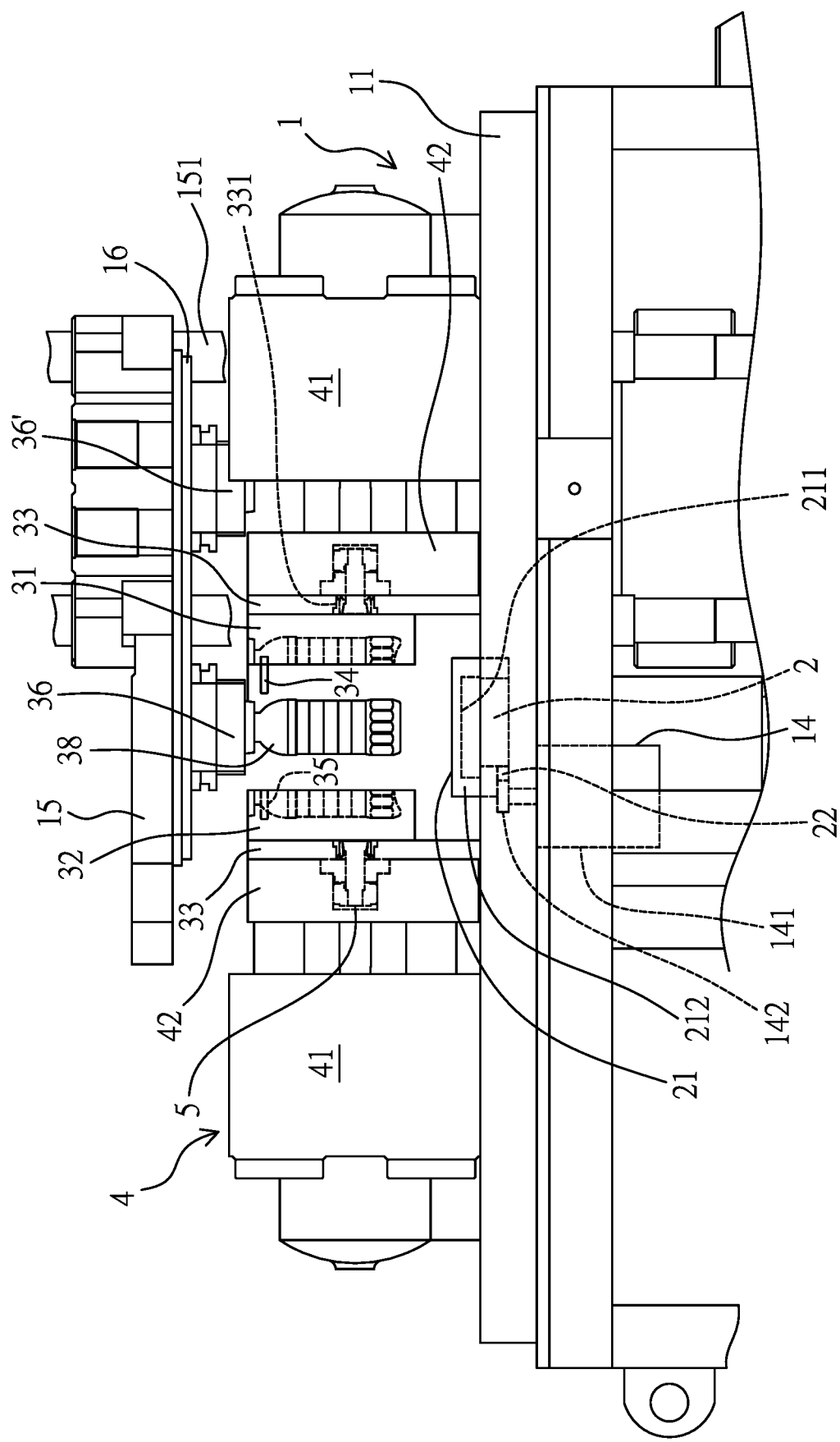
FIG. 4 is a schematic view illustrating the mold of FIG. 3 being located at the operating zone and the extrusion blow molding process being finished.

An elevation seat 15 is disposed above the operating zone 12, an interior of the elevation seat 15 is pivoted with a rotary plate 16, and the rotary plate 16 is disposed with a first bottle preform holding mold 36 and a second bottle preform holding mold 36' which are oppositely arranged at an angle of 180 degrees (as shown in FIG. 1 and FIG. 2). The elevation seat 15 is driven by an elevation driving device, for example a hydraulic cylinder or a pneumatic cylinder (not shown in figure), so that the elevation seat 15 is able to be fastened on a plurality of supporters 151 of the machine table 11 and longitudinally ascended or descended, and the rotary plate 16 is synchronously driven to be longitudinally ascended or descended. When a molding operation is desired to be processed, the elevation seat 15 is served to drive the rotary plate 16 and the first bottle preform holding mold 36 and the second bottle preform holding mold 36' to be descended, so that a bottle preform 37 clamped by the first bottle preform holding mold 36 is enabled to enter the mold 3 which is in a mold opening status, and the open/close driving mechanism 4, for example an oil pressure cylinder, is served to perform a closing mold operation (as shown in FIG. 3). At this moment, the mold 3 and an extended rod disposed above are descended via a retractable driving device, for example a pneumatic cylinder (known as prior art therefore not shown in figures), and the extended rod is allowed to pass and seal the first bottle preform holding mold 36 and protrude into an interior of the bottle preform 37 so as to process an inflating operation for enabling the bottle preform 37 to be inflated and adhered on an inner wall of the mold 3; when the inflating operation is finished, the open/close driving mechanism 4 is served to perform a mold opening operation, and a bottle body 38 clamped by the first bottle preform holding mold 36 is formed as shown in FIG. 4; what shall be mentioned is that the bottle blowing procedure is known as a prior art and has been disclosed in Taiwan Utility Patent No. M344969 (equivalent to China Patent No. 200820115856.3 and U.S. Pat. No. 8,002,539), therefore no further illustration is provided.

Figure 5:
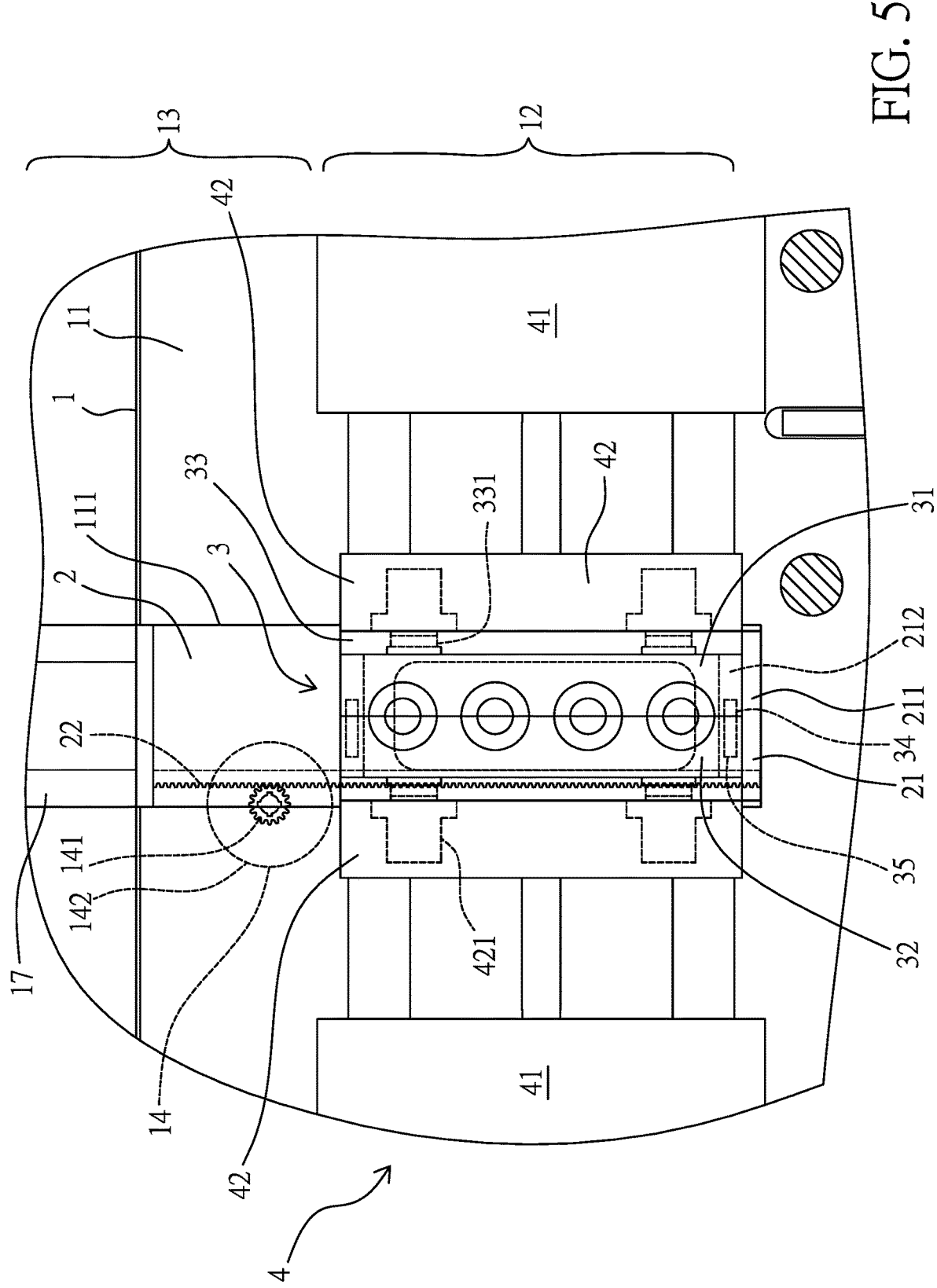
FIG. 5 is a top view illustrating the rapid mold replacing device being located at the operating zone and the locking mechanism being in a locked status according to the present invention.
Figure 6:
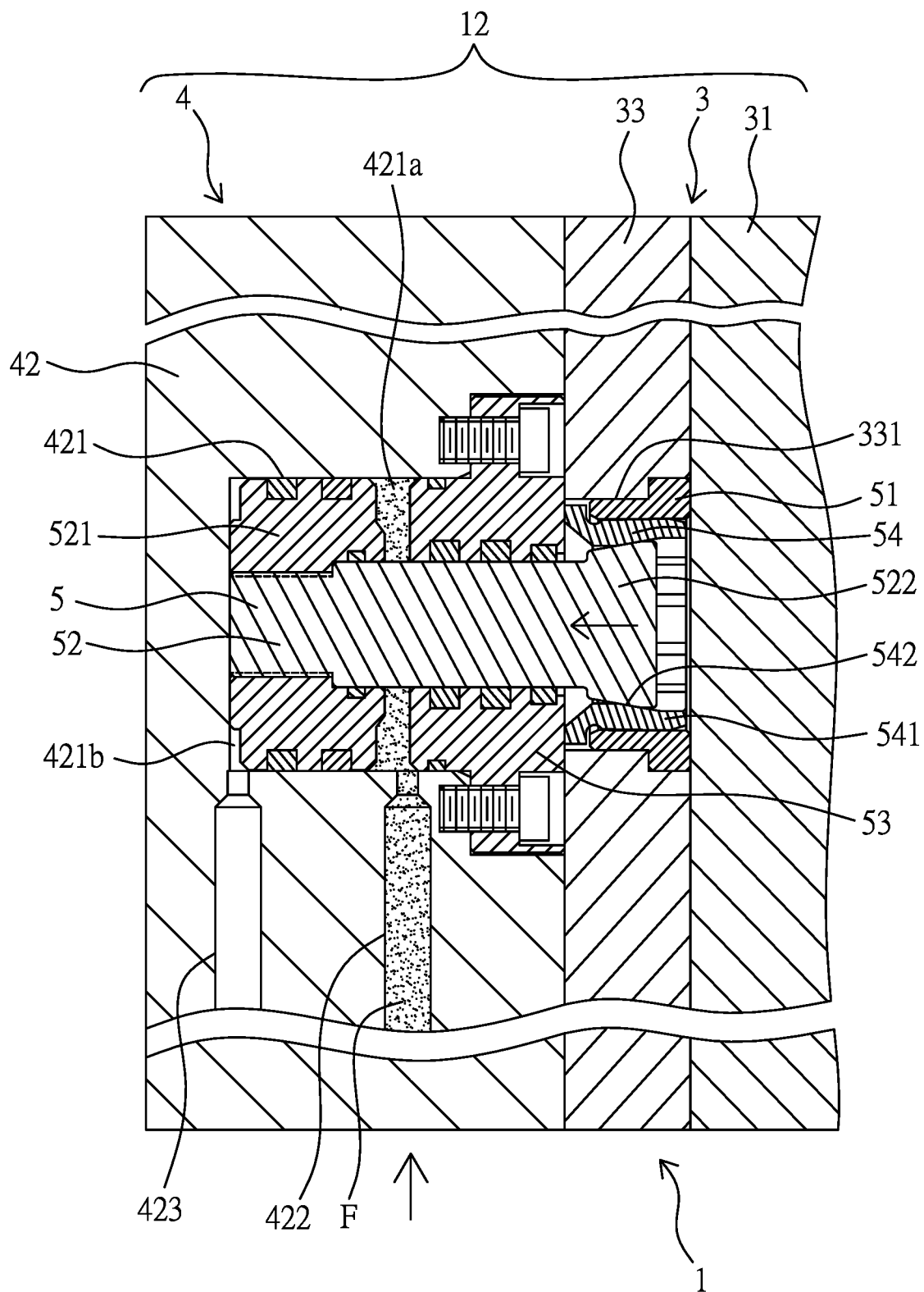
FIG. 6 is a partially enlarged cross sectional view illustrating the locking mechanism of FIG. 5 being utilized for locking the mold and the open/close driving mechanism according to the present invention.

As shown from FIG. 1 to FIG. 4, the open/close driving mechanism 4 includes a pair of moveable plates 42 oppositely disposed and arranged at two sides of the operating zone 12, each of the moveable plates 42 is, for example but not limited to be, driven by a retractable cylinder 41 disposed at the same side, thereby forming an opening/closing motion. The lateral plates 33 at two sides of the mold 3 and adjacent to the moveable plates 42 are respectively disposed with the at least one locking mechanism 5. As shown in FIG. 5 and FIG. 6, for fully disclosing a locking and an unlocking relations between the moveable plates 42, the lateral plates 33 and the locking mechanisms 5, the moveable plate 42, the lateral plate 33 and the locking mechanism 5 arranged at the left side are adopted for illustrations.

The locking mechanism 5 includes a fastening lock ring 51 received in a plate hole 331 of the lateral plate 33, and a valve rod 52 disposed in a valve chamber 421 of the moveable plate 42; the valve chamber 421 is formed as a stepped hole, an outer side thereof is disposed with a fasten cover 53, and the valve rod 52 is allowed to axially penetrate the fasten cover 53 in the valve chamber 421, one end of the valve rod 52 is fastened, for example screwed, with a rod seat 521 which is tightly connected to an inner circumference of the valve chamber 421, the valve chamber 421 defined between the rod seat 521 and the fasten cover 53 is formed as a retracting zone 421a, and the retracting zone 421a is communicated with a first conveying pipe 422 of a locking fluid cylinder, for example a hydraulic cylinder or a pneumatic cylinder, allowing a fluid F to be filled or returned. A stretching zone 421b is formed between the rod seat 521 and an interior of the valve chamber 421, and the stretching zone 421b is communicated with a second conveying pipe 423 of the locking fluid cylinder allowing the fluid F to be filled or returned.

The valve rod 52 protruding from one distal end of the fasten cover 53 is formed with a conical head part 522, an outer side of the conical head part 522 is sleeved with an expanding/retracting lock ring 54, an outer circumference of the expanding/retracting lock ring 54 is annularly formed with a plurality of claw pieces 541, and inner circumferences of the claw pieces 541 are respectively formed with a conical surface 542 matched with a contour the conical head part 522. As such, through the conical head part 522 being axially moved along the conical surface 542, the claw pieces 541 are enabled to be radially expanded or retracted, thereby forming an interfered locking status or a released unlocking status with the fastening lock ring 51.

As shown in FIG. 6, when the locking fluid cylinder is actuated, the fluid F, for example a liquid, is filled into the retracting zone 421a between the rod seat 521 and the fasten cover 53 via the first conveying pipe 422, a fluid flowing pressure generated by the fluid F can be served to move the valve rod 52 and the rod seat 521 towards the direction of the moveable plate 42, for example being moved towards the left, so as to enter the stretching zone 421b, and the conical head part 522 is moved towards the left along the conical surfaces 542, so that the claw pieces 541 are able to be radially expanded for forming the interfered locking status with the fastening lock ring 51. Accordingly, with the locking mechanism 5, the mold 3 including the left mold member 31 and the right mold member 32 can be tightly combined with the pair of moveable plates 42 of the open/close driving mechanism 4 and be precisely positioned at the operating zone 12 without the need of tightening or detaching a connection member, for example a screw, and the above-mentioned molding operation, such as the extrusion blow molding process, can be performed.

Figure 7:
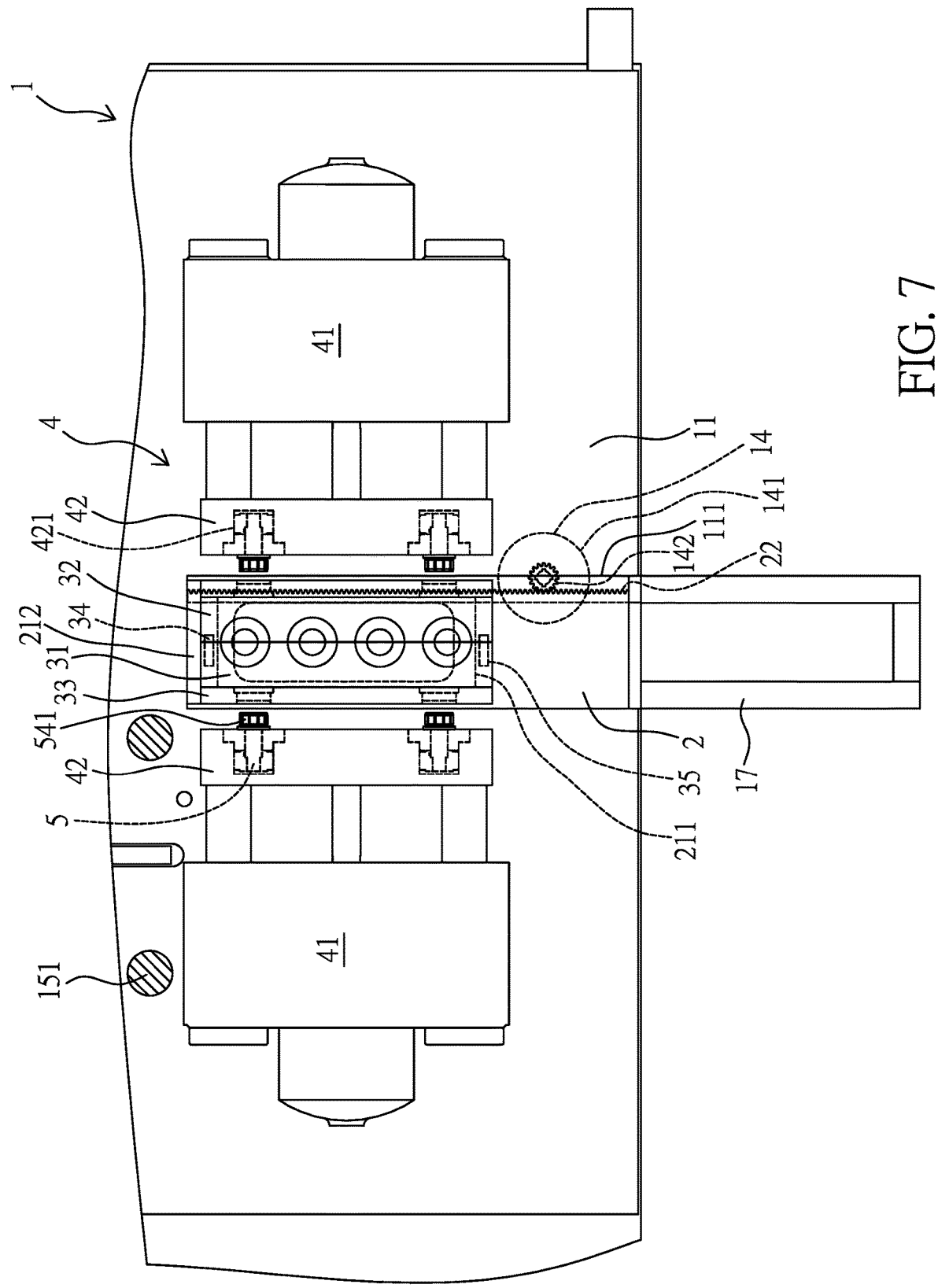
FIG. 7 is a top view illustrating the rapid mold replacing device being located at the operating zone and the locking mechanism being in an unlocked status according to the present invention.
Figure 8:
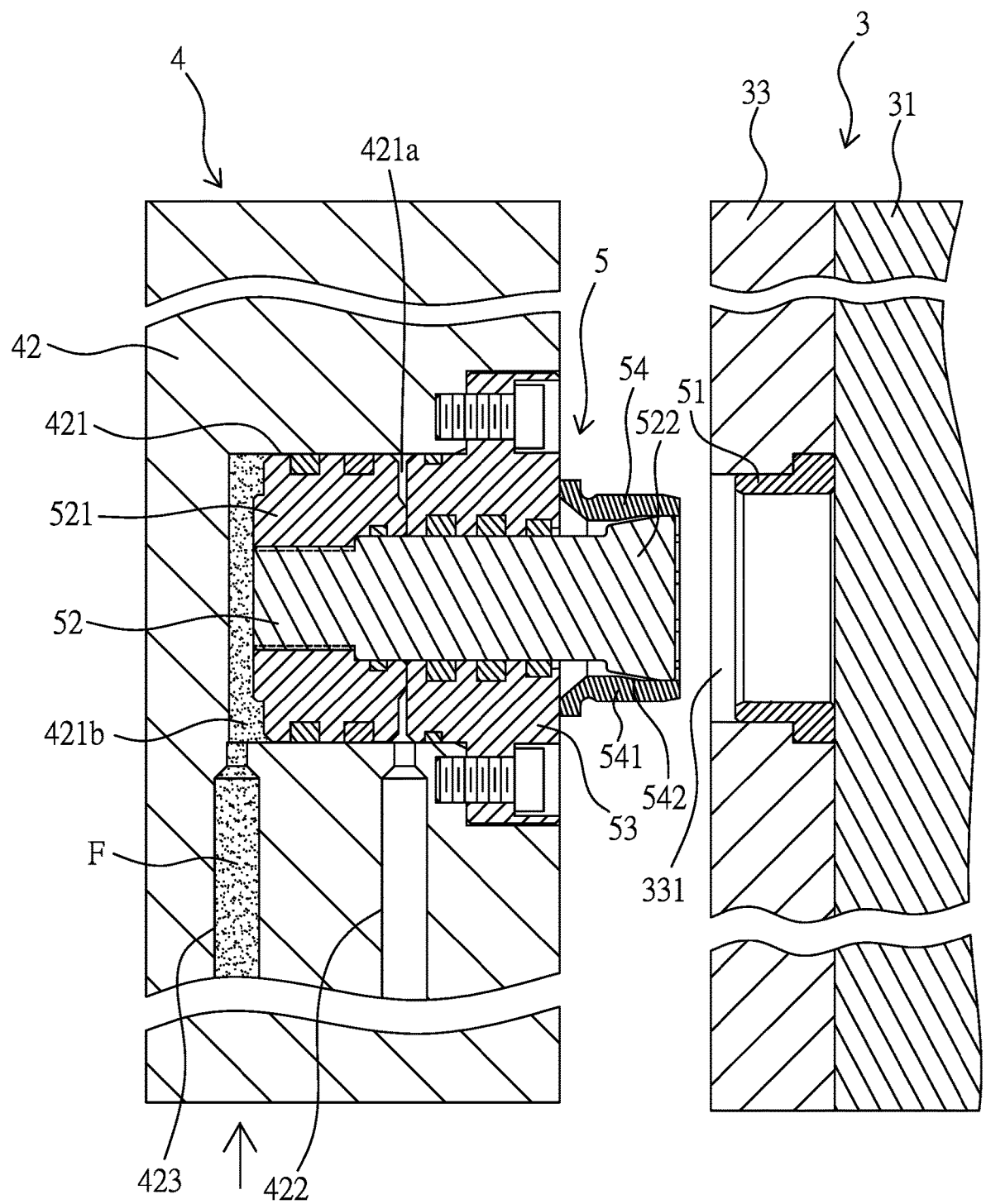
FIG. 8 is a partially enlarged cross sectional view illustrating the locking mechanism of FIG. 7 being utilized for unlocking the mold and the open/close driving mechanism according to the present invention.

Please refer to FIG. 7 and FIG. 8, when the mold 3 is desired to be replaced, the operation personnel switches the first conveying pipe 422 to the second conveying pipe 423 of the locking fluid cylinder, in other words the first conveying pipe 422 is closed and the second conveying pipe 423 is opened, so that the fluid F is filled into the stretching zone 421b between the rod seat 521 and the bottom end of the valve chamber 421 via the second conveying pipe 423, the fluid flowing pressure generated by the fluid F can be served to move the valve rod 52 and the rod seat 521 towards the direction of the mold 3, for example being moved towards the right, so as to enter the retracting zone 421a until the rod seat 521 is abutted against the fasten cover 53, and the conical head part 522 is moved towards the right along the conical surfaces 542, so that the claw pieces 541 are able to be radially retracted for forming the released unlocking status with the fastening lock ring 51. Then, the open/close driving mechanism 4 is actuated for enabling the pair of moveable plates 42 to be in an opened status, so that the expanding/retracting lock rings 54 can be respectively released from the corresponding plate hole 331 of the mold 3.

Figure 9:
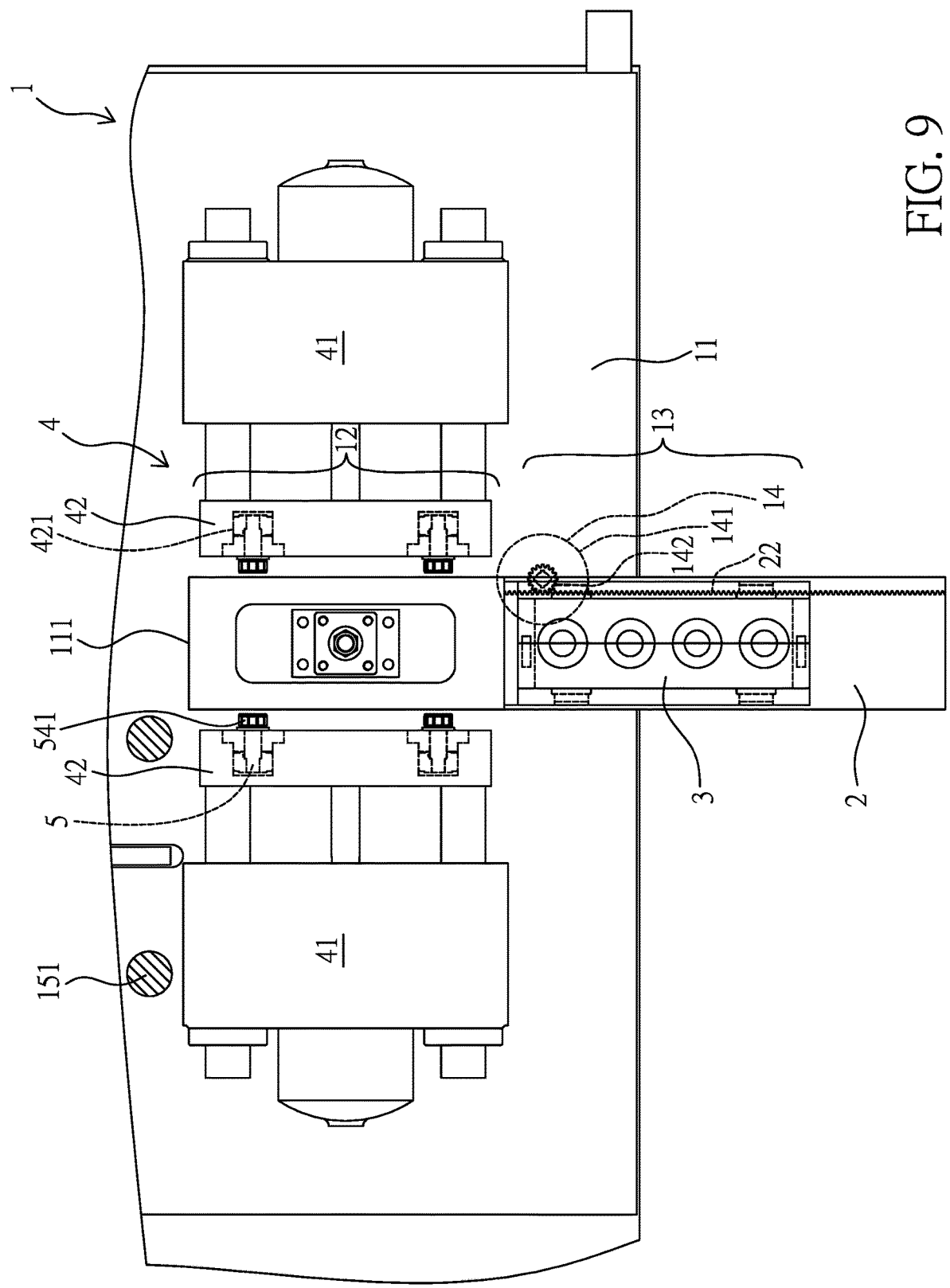
FIG. 9 is a top view illustrating the rapid mold replacing device being moved to the open space according to the present invention.
Figure 10:
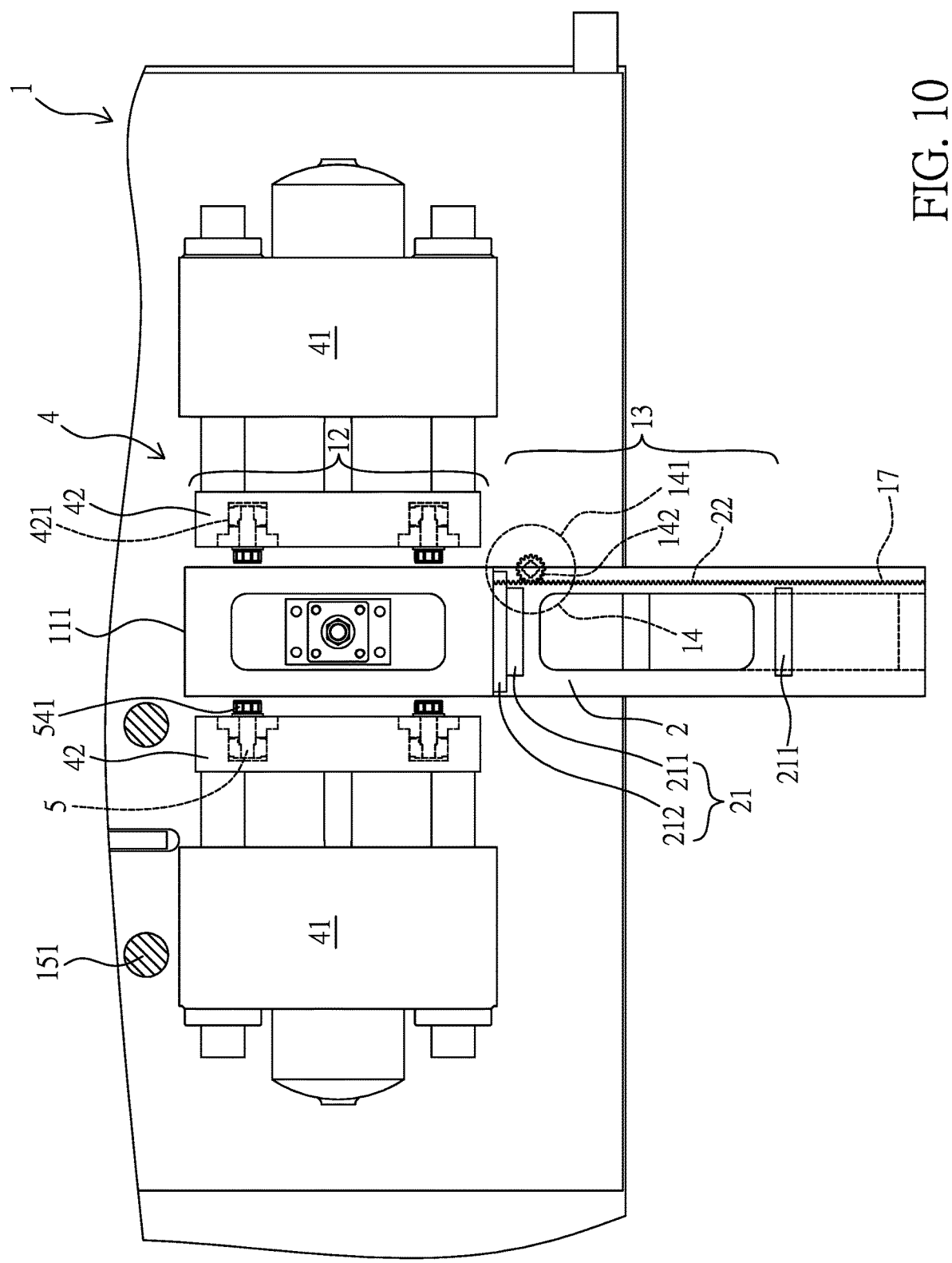
FIG. 10 is a top view illustrating the mold being removed from the rapid mold replacing device according to the present invention.

Please refer to FIG. 9 and FIG. 10, when the locking mechanisms 5 between the pair of moveable plates 42 and the mold 3 are unlocked, the power source 141 of the transmission mechanism 14 is actuated, the passive member 22 of the carrier 2 at the operating zone 12 is driven by the transmission member 142 to be outwardly moved to the open space 13, thereby allowing the mold 3 to be rapidly and easily replaced. FIG. 10 shows a status of the mold 3 being removed from the carrier 2. Wherein, there is an additional supporter 17 disposed on the machine table 11 and arranged at a lateral side of the open space 13 for supporting the carrier 2 and the mold 3. After the mold 3 is replaced, the carrier 2 and the mold 3 are returned to the operating zone 12 by utilizing the transmission mechanism 14, then the pair of moveable plates 42 of the open/close driving mechanism 4 are synchronously processed with a stretching operation for allowing the pair of moveable plates 42 and the newlyreplaced mold 3 to be locked by utilizing the locking mechanisms 5, so that the above-mentioned molding operation, for example the extrusion blow molding process, can be performed.

Based on what has been disclosed above, advantages achieved by the present invention are as followings: the open/close driving mechanism and the mold can be locked or unlocked by utilizing the locking mechanisms, thereby avoiding the inconvenience caused by tightening or detaching a connection member, for example a screw; moreover, the mold disposed on the carrier can be moved between the operating zone and the open space through the operations of the carrier and the transmission mechanism, so that the mold can be rapidly and easily replaced, and effects of saving labor and reducing working time can be provided; accordingly, the rapid mold replacing device for use in molding machine provided by the present invention is novel and more practical in use comparing to prior art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A rapid mold replacing device for use in molding machine, comprising:
    a molding machine, including a machine table defined with an operating zone and an open space adjacently arranged, wherein said machine table further includes a transmission mechanism;
    a carrier, disposed on said machine table, wherein a top surface thereof is disposed with a positioning mechanism for positioning a mold, said carrier is driven by said transmission mechanism, so that said carrier is able to be moved and positioned between said operating zone and said open space; and
    an open/close driving mechanism, including a pair of moveable plates oppositely disposed and arranged at two sides of said operating zone, wherein said pair of moveable plates are driven by said open/close driving mechanism, thereby forming an opening/closing motion; two sides of said mold are respectively disposed with a lateral plate at a location adjacent to each of said moveable plates, at least one locking mechanism is disposed between said lateral plate and said moveable plate; each of said at least one locking mechanism includes a fastening lock ring located in a plate hole of said lateral plate and fixed in the mold, and a valve rod disposed in a valve chamber of said moveable plate, one end of said valve rod is fastened with a rod seat which is tightly connected to an inner circumference of said valve chamber, wherein a retracting zone allowing a fluid to be filled or returned is formed in said valve chamber defined between said rod seat and a fasten cover, and a stretching zone allowing said fluid to be filled or returned is formed between said rod seat and an interior of said valve chamber; said valve rod axially protruding from one distal end of said fasten cover disposed in said valve chamber is formed with a conical head part, an outer side of said conical head part is inserted into an expanding/retracting lock ring, an outer circumference of said expanding/retracting lock ring is radially and annularly formed with a plurality of claw pieces, and inner circumferences of said plurality of claw pieces are respectively formed with a conical surface matched with a contour of said conical head part of said valve rod;
    wherein, when said moveable plate engages said lateral plate, said expanding/retracting lock ring is located between said conical head part of said valve rod and said fastening lock ring and said expanding/retracting lock ring engages said conical head part of said valve rod and said fasten cover, through selectively filling said fluid into said retracting zone or said stretching zone, said valve rod and said rod seat are able to be axially moved in said valve chamber, and said conical head part is axially moved along said conical surface of said expanding/retracting lock ring and said plurality of claw pieces are selectively enabled to be radially expanded and retracted by said conical head part, thereby selectively forming an interfered locking status and a released unlocking status with said fastening lock ring, the outer side of said conical head part remains inserted in the expanding/retracting lock ring in both the interfered locking status and the released unlocking status;
    wherein, when said at least one locking mechanism is located in the interfered locking status, said plurality of claw pieces of said expanding/retracting lock ring and said fastening lock ring are located in said plate hole of said lateral plate of said mold, said mold and said open/close driving mechanism are connected by said plurality of claw pieces of said expanding/retracting lock ring being expanded by said conical head part of said valve rod by moving said rod seat and said conical head part of said valve rod to a bottom of said valve chamber of said open/close driving mechanism and said plurality of claw pieces being engaged with said fastening lock ring;
    wherein, when said at least one locking mechanism is located in the released unlocking status, said conical head part of said valve rod and said expanding/retracting lock ring are connected to said open/close driving mechanism by said fastening cover, said fastening lock ring is connected to said mold, said fastening lock ring and said expanding/retracting lock ring are released and unlocked, and said mold and said open/close driving mechanism are released and unlocked.

2. The rapid mold replacing device for use in molding machine as claimed in claim 1, wherein said positioning mechanism includes a pair of positioning blocks spaced with an interval and arranged in parallel, outer surfaces of said pair of positioning blocks are adjacently connected to inner surfaces of said pair of lateral plates of said mold, and a circumference of one of said pair of positioning blocks is additionally disposed with a stopping block which is abutted against a front end surface or a rear end surface of said mold, thereby allowing said mold to be positioned on said top surface of said carrier.

3. The rapid mold replacing device for use in molding machine as claimed in claim 2, wherein said mold includes a left mold member and a right mold member, adjacent surfaces between said left mold member and said right mold member are correspondingly disposed with at least one positioning pin and at least one positioning hole which are in an inserted status, thereby preventing said left mold member and said right mold member from being separated;

wherein, said locking member engages said lateral plate and a corresponding one of said left mold member and said right mold member.

4. The rapid mold replacing device for use in molding machine as claimed in claim 1, wherein said transmission mechanism includes a power source, and a transmission member connected to said power source and used for outputting power; and said carrier is disposed with a passive member driven by said transmission member.

5. The rapid mold replacing device for use in molding machine as claimed in claim 4, wherein said power source is an oil pressure motor capable of normally and reversely rotating, said transmission member is a transmission gear, and said passive member is a gear rack.

6. The rapid mold replacing device for use in molding machine as claimed in claim 4, wherein said power source is an oil pressure motor capable of normally and reversely rotating, said transmission member is a screw rod, and said passive member is a screw sleeve.

7. The rapid mold replacing device for use in molding machine as claimed in claim 4, wherein said power source is a fluid driving cylinder, said transmission member is a retractable rod, and said passive member is a connection sleeve.

8. The rapid mold replacing device for use in molding machine as claimed in claim 1, wherein said retracting zone is connected to a locking fluid cylinder allowing said fluid to be filled or returned via a first conveying pipe; and said stretching zone is connected to said locking fluid cylinder allowing said fluid to be filled or returned via a second conveying pipe.

9. The rapid mold replacing device for use in molding machine as claimed in claim 1, wherein a supporter disposed on said machine table and arranged at a lateral side of said open space is provided for supporting said carrier and said mold.

10. The rapid mold replacing device for use in molding machine as claimed in claim 1, wherein said molding machine is a horizontal injection molding machine, a horizontal bottle blowing molding machine or a horizontal injection bottle blowing molding machine.

* * * * *